G. ROGERS.

Assignor of three-fourths interest to C. G. COOPER, F. L. FAIRCHILD and C. COOPER.

Traction-Engine.

No. 8,526. Reissued Dec. 17, 1878.

Witnesses:
M. Georgus
D. P. Cowl

George Rogers
Inventor:
by his attorney
A. R. Bailey

N. PETERS, PHOTO-LITHOGRAPHER, WASHINGTON, D. C.

UNITED STATES PATENT OFFICE.

GEORGE ROGERS, OF MOUNT VERNON, OHIO, ASSIGNOR OF THREE-FOURTHS INTEREST TO CHARLES G. COOPER, FRANK L. FAIRCHILD, AND CHARLES COOPER.

IMPROVEMENT IN TRACTION-ENGINES.

Specification forming part of Letters Patent No. 173,498, dated February 15, 1876; Reissue No. 7,736, dated June 12, 1877; Reissue No. 8,164, dated April 9, 1878; Reissue No. 8,526, dated December 17, 1878; application filed November 18, 1878.

*To all whom it may concern:*

Be it known that I, GEORGE ROGERS, of Mount Vernon, in the county of Knox, and in the State of Ohio, have invented certain new and useful Improvements in Traction-Engines; and I do hereby declare that the following is a clear, full, and exact description thereof, that will enable others skilled in the art to which it appertains to make and use the same, reference being had to the accompanying drawings, and to the letters of reference marked thereon, which form a part of this specification.

My invention relates to an improvement in traction-engines.

Figure 1:
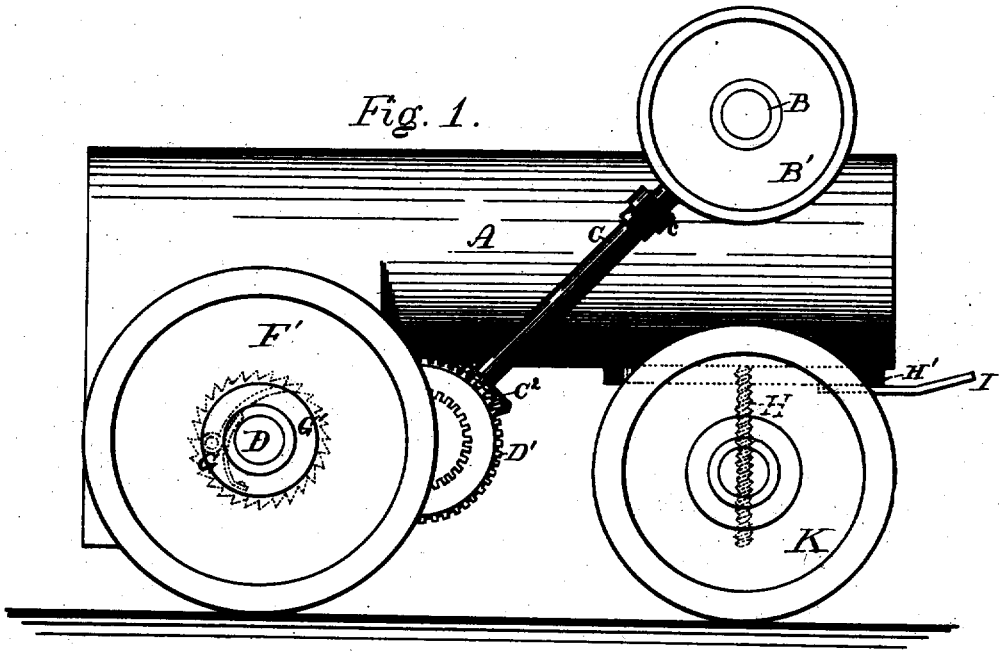
Figure 2:
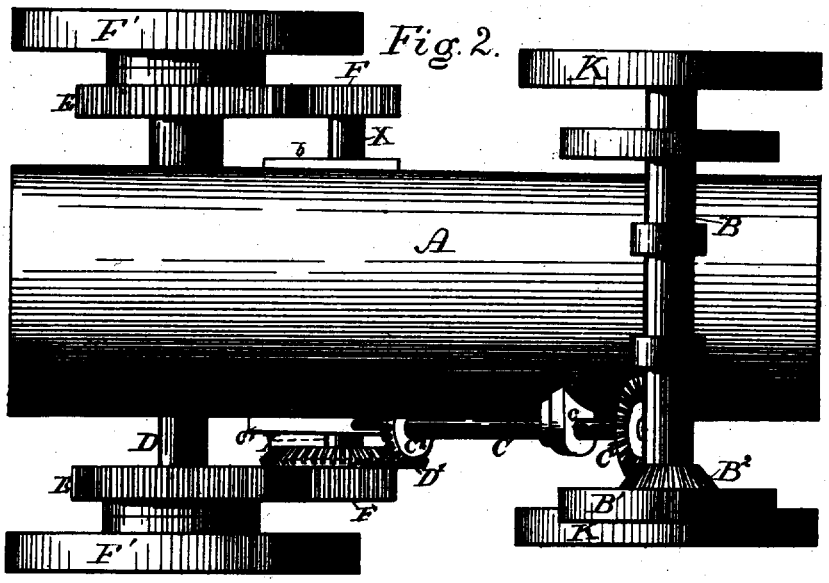

In the drawing, Figure 1 is a side elevation of so much of a traction-engine as is needed to illustrate my invention. Fig. 2 is a plan of the same.

A is the boiler of the engine, and B is the driving-shaft, to which power is applied from the engine-cylinder, and upon which is fixed a balance or fly wheel, $B^1$, which may also serve as a primary pulley to operate machinery. The boiler is supported at its rear by truck-wheels F′ and at its front by truck-wheels K. The truck-wheels F′ are mounted upon a shaft, D, which may be either continuous or divided—that is to say, each wheel may have its own axle, or one axle may serve for both. In either case, however, there is practically but one axle, which I shall term the "rear axle," constituting the axis of revolution of the wheels F′. The truck-wheels F′ are rotated by means of gear-wheels E, which have the rear axle as their axis, and mesh with pinions or cog-wheels F, fixed on a shaft, X, which I term the "supplemental shaft," revolving in suitable bearings or boxes *c′ b*, carried by the boiler. The supplemental shaft is operated from the engine or driving shaft B by means of gears or gears and shafting, in contradistinction to such means as require the intermediary of a belt or chain. In the arrangement for this purpose shown in the drawing said supplemental shaft derives its motion from the driving-shaft B through the intermediary of the shaft C, which I shall term the "connecting-shaft." This connecting-shaft, supported in suitable bearings *c c′*, engages at one end the driving-shaft and at the other end the supplemental shaft. The engagement is effected, in the present instance, by means of beveled gearings $B^2$ $C^1$ $C^2$ D′, as shown.

When the wheels F′ and E are made and mounted on their axle separately, the pawl and ratchet G G′, applied the one to the gear E and the other to the truck-wheel F′, will cause the truck-wheels to be driven by the gear, and yet admit of the independent movement or revolution of the truck-wheels to any extent whenever this becomes necessary—as, for instance, in turning the machine to the right or left, or in turning the machine completely around or in a circle. In the present case the pawls and ratchets are in the housings of the wheels F′ E, and these wheels revolve freely on their axle.

H is a screw passing from the boiler down through the front truck or axle, answering not only as a king-bolt, but also as a lifting-jack, by means of the nut-wheel H′, mounted on the screw between the boiler and the front axle or truck, and resting on the latter. By turning the nut-wheel in one direction or the other, the front end of the boiler will be raised from or lowered toward the front axle. When the boiler is so actuated it moves upon the rear axle as its axis. The pinions F of the supplemental shaft (which participates in this movement of the boiler) therefore move in the arc of a corresponding circle, and consequently preserve their engagement with the gears E.

I is a tongue or pole, for attachment of horses, oxen, &c., for the purpose not only of assisting in the draft, but likewise of steering or guiding the machine.

I also remark in this connection that the arrangement of the pawl-and-ratchet device between the truck-wheels and the driving mechanism by which such wheels are operated permits animal-power or draft-animals to be used interchangeably with steam-power to move the engine without requiring the gearing to be disengaged. If, for instance, the first or driving shaft B be stopped and the engine be drawn by animals harnessed to the pole I, the truck-wheels F′ will revolve freely, the teeth of their ratchets G′ riding over the pawls G, and thus all the driving mechanism in front of the pawl-and-ratchet device—that is to say, between that device and the prime mover—remains at rest.

If it be again desired to use steam-power, all that is needed is to turn on steam and put in movement the driving-shaft B.

Thus by the arrangement of the pawl-and-ratchet device between the truck-wheels and the prime mover it is practicable to use, in moving the engine from place to place, steam and animal power, either together or interchangeably; and in case the engine is drawn by animals this can be accomplished without disconnecting gearing, and at the same time without putting in motion any of the driving mechanism or gearing intermediate between the pawl-and-ratchet arrangement and the prime mover.

The feature of adjusting the elevation of the front end of the boiler is for the purpose of maintaining, as nearly as possible, the level position of the boiler in traveling upon an inclined road, so as to insure safety, by having the crown-sheet and flues at all times properly covered with water.

The invention herein described is especially adapted to portable engines, now so extensively used for farming purposes and for sawing timber in various places.

It has heretofore been found more or less difficult, especially during inclement seasons, to convey the so-called "portable engines" from place to place.

This invention is intended to obviate, to a great extent, at least, this difficulty and objection, and its character is such as to render it easily adaptable to portable engines already in use, and not provided with any power of self-locomotion.

Having described my invention, what I claim, and desire to secure by Letters Patent, is—

1. The combination of the driving-shaft and the rear axle, having truck-wheels adapted to be loosely or rigidly secured to it, with the supplemental shaft provided with cog-wheels, gearing with wheels on the rear axle, and the intermediate connecting-shaft, engaging at one end the driving-shaft and at the other end the supplemental shaft, as herein shown and set forth.

2. In a traction-engine, the combination, substantially as set forth, of the truck-wheels with the independent spur or gear wheels for driving the same, mounted on the same axis with the truck-wheels and engaging the same, substantially in the manner described, so that each truck-wheel may, when occasion requires, move independently both of the spur-wheel by which it is driven and of the other truck-wheel.

3. In a traction-engine, the combination, with the rear truck-wheels and the independent spur or gear wheels for driving the same, mounted on the same axis with the truck-wheels and engaging them, substantially as described, of the front truck or axle, adapted to turn upon a vertical pivot independently of the boiler, which it in part supports, substantially as set forth.

4. In a traction-engine, a boiler supported so as to be capable of oscillatory movement upon its power-driven axle as an axis, and means for so moving said boiler, in combination with a rotary supplemental shaft, which derives its rotary movement from the driving-shaft of the engine, is carried by and partakes of the movement of the boiler, and gears with wheels on said axle, substantially as shown and set forth.

5. The combination, with the boiler and the driving-shaft, of the rear axle, having truck-wheels adapted to be loosely or rigidly secured to it, and the supplemental shaft operated, substantially as specified, from the driving-shaft, and provided with cog-wheels that gear with wheels on the said axle, substantially as set forth.

6. In a steam traction-engine, which is also adapted to be moved by draft-animals, the combination of these elements: the boiler, the engine proper, power-driven supporting-wheels, mechanism for communicating movement from the driving-shaft of the engine to said wheels, and a pawl-and-ratchet arrangement forming part of said communicating mechanism, and operating to permit, when occasion demands, the said wheels to revolve independently of and without communicating motion to that part of the mechanism intermediate between said pawl-and-ratchet arrangement and the driving-shaft of the engine, the combination being and acting substantially as and for the purposes set forth.

In testimony whereof I have hereunto set my hand this 11th day of November, 1878.

GEO. ROGERS.

Witnesses:
C. F. COOPER,
S. J. BUTLER.